US005500782A

United States Patent [19]

[11] Patent Number: 5,500,782

[45] Date of Patent: Mar. 19, 1996

Oertel et al.

[54] HYBRID SURGE PROTECTOR

[75] Inventors: Hans-Wolfgang Oertel; David L. Martin, both of Goleta, Calif.

[73] Assignee: Joslyn Electronic Systems Corporation, Goleta, Calif.

[21] Appl. No.: 145,337

[22] Filed: Oct. 29, 1993

[51] Int. Cl.[6] .......... H02H 3/20

[52] U.S. Cl. .......... 361/120; 361/56; 361/124; 361/127

[58] Field of Search .......... 361/56, 91, 111, 361/118, 119, 120, 124, 127

[56] References Cited

U.S. PATENT DOCUMENTS

| | | | |
|---|---|---|---|
| 3,703,665 | 11/1972 | Yereance et al. | 317/61 |
| 3,863,111 | 1/1975 | Martzloff | 317/61.5 |
| 4,023,071 | 5/1977 | Fussell | 361/56 |
| 4,099,217 | 7/1978 | Fitchew | 361/56 |
| 4,158,869 | 6/1979 | Gilberts | 361/118 |
| 4,188,561 | 2/1980 | Pranke et al. | 361/124 |
| 4,199,736 | 4/1980 | McTaggart et al. | 333/17 L |
| 4,208,694 | 6/1980 | Gilberts | 361/119 |
| 4,241,374 | 12/1980 | Gilberts | 361/124 |
| 4,249,224 | 2/1981 | Baumbach | 361/124 |
| 4,288,833 | 9/1981 | Howell | 361/124 |
| 4,308,566 | 12/1981 | Imataki et al. | 361/125 |
| 4,321,649 | 3/1982 | Gilberts | 361/119 |
| 4,359,764 | 11/1982 | Block | 361/119 |
| 4,467,390 | 8/1984 | Carpenter, Jr. | 361/56 |
| 4,493,003 | 1/1985 | Mickelson et al. | 361/119 |
| 4,502,087 | 2/1985 | Huvet | 361/119 |
| 4,633,359 | 12/1986 | Mickelson et al. | 361/119 |
| 4,663,692 | 5/1987 | Carothers et al. | 361/117 |
| 4,734,823 | 3/1988 | Cunningham | 361/125 |
| 4,862,311 | 8/1989 | Rust et al. | 361/91 |
| 4,866,562 | 9/1989 | Jones | 361/119 |
| 4,910,632 | 3/1990 | Shiga et al. | 361/127 |
| 5,224,012 | 6/1993 | Smith | 361/119 |
| 5,278,720 | 1/1994 | Bird | 361/119 |
| 5,384,679 | 1/1995 | Smith | 361/119 |

OTHER PUBLICATIONS

Joslyn Drawing No. 1061–1063 A. Collins Jul. 26, 1984.
Joslyn Drawing No. 82140 Ron Snyder Sep. 27, 1979.
"Surge Absorber"—Okaya Electric Industries Co., Ltd.—Catalog-277-91 Jan. 1991.
"Advancing Electronic Technology"—Semitron Jan. 1992.

*Primary Examiner*—Brian K. Young
*Assistant Examiner*—S. Jackson
*Attorney, Agent, or Firm*—Marshall, O'Toole, Gerstein, Murray & Borun

[57] ABSTRACT

A protector arrangement is disclosed having first and second protector terminals, a gas discharge tube, and a metal oxide varistor. The gas discharge tube is connected to the first and second protector terminals. The metal oxide varistor is connected to the first and second protector terminals so that the metal oxide varistor acts as a backup to the gas discharge tube and so that the first and second protector terminals are automatically shorted in response to a thermal overload condition. The protector arrangement may be mounted in a weathertight housing.

32 Claims, 5 Drawing Sheets

HYBRID SURGE PROTECTOR

TECHNICAL FIELD OF THE INVENTION

The present invention relates to surge protectors, such as used in telecommunication systems, which respond to high energy electrical surges on electrical conductors by absorbing and discharging those high energy electrical surges before they can damage electrical equipment connected to the electrical conductors.

BACKGROUND OF THE INVENTION

Electrical surges on electrical conductors are produced as a result of lightning strikes, operation of certain electrical equipment, electromagnetic surges, static electricity, induced voltages, and the like. If such electrical surges are severe, they can break down the insulation of the electrical equipment connected to the electrical conductors carrying the electrical surges and thereby damage the electrical equipment. To prevent such damage, it has been known to protect electrical equipment from damaging electrical surges by connecting surge protectors to the electrical conductors connected to the electrical equipment to be protected.

One commonly used surge protector includes a parallel combination of a gas pressurized discharge tube and an air gap connected between an electrical conductor and ground. The gas discharge tube conducts in the presence of an electrical surge to direct the electrical surge to ground. The air gap operates as a backup protection element for the gas discharge tube in case the gas discharge tube is vented. Thus, if the gas discharge tube fails in a vented condition, the backup air gap breaks down in the presence of an overvoltage electrical surge to conduct the electrical surge to ground.

The use of an air gap as a backup to a gas discharge tube, however, presents several problems. For example, while the gas discharge tube is selected to have a breakdown voltage from the tens of volts to the hundreds of volts depending upon the electrical equipment to be protected, an air gap typically has a breakdown voltage on the order of 1,000 to 1,500 volts. This breakdown voltage offered by an air gap is often too high to provide effective protection. Even if the gas discharge tube has not failed, the backup air gap may fire before the gas discharge tube in response to fast rising transients. This operation can also result in the build up of carbon on the electrodes of the backup air gap. When enough carbon builds up, noise and intermittent shorts may be created which can adversely affect the protected electrical equipment. For example, in telecommunication applications, telephone lines can become noisy, and/or can be rendered inoperable due to intermittent shorts. Furthermore, backup air gaps are susceptible to moisture and other contamination between the electrodes thereof. This contamination may not only cause noise, but also may result in premature failure of the surge protector.

Another known surge protector includes a parallel combination of a gas discharge tube and a metal oxide varistor. A metal oxide varistor typically provides a much lower clamping voltage than the gas discharge tube. Such a surge protector can be used for either high voltage or low voltage applications depending upon the proper selection of the gas discharge tube and the metal oxide varistor. In high voltage applications, the metal oxide varistor is normally a high energy metal oxide varistor having a large diameter, a high capacitance, and high leakage currents. In signal and dataline applications, for example, the clamping voltage of the metal oxide varistor is typically lower than the breakdown voltage of the gas discharge tube. In the protection of low voltage telecommunication equipment used in telephone subscriber stations and in central offices, the surge protector must have low capacitance and high insulation resistance so that the surge protector is transparent to the telecommunication equipment. For example, electrical specifications for telecommunication equipment typically require that the surge protector has a capacitance below 30 pF per line. Compared to this capacitance, conventional hybrid or solid state surge protectors have capacitance values exceeding 30 pF and may exceed several hundred picofarads.

Thus, a very small diameter metal oxide varistor must be chosen in order to present a low capacitance to the protected electrical equipment, particularly telecommunication equipment. At the same time, the metal oxide varistor and the gas discharge tube must ideally be matched so that the clamping voltage of the metal oxide varistor is just above the upper tolerance of the breakdown voltage of the gas discharge tube. This matching ensures that the gas discharge tube is the primary surge protection element in the surge protector and that the metal oxide varistor provides backup protection in case the gas discharge tube fails to properly operate.

Surge protectors, particularly those used in telecommunication systems, must be capable of offering protection in spite of a power cross or a failure of any of the protective elements. Power cross, particularly in the telecommunication arts, occurs when live alternating current power distribution cables come in direct contact with telephone wires causing high voltage alternating current power to be conducted through low voltage local telephone circuits. This high voltage alternating current power can heat and overstress the surge protective devices in the surge protector and cause a thermal overload condition. If adequately designed, the surge protector will provide a "failsafe" condition by shorting the affected line to ground.

SUMMARY OF THE INVENTION

The present invention is directed to a surge protector which combines the robust operation of a gas discharge tube (i.e., a gas discharge tube can conduct surges of over 20,000 amperes for short durations, e.g., 20 microseconds, or multiple 10 to 500 ampere surges of longer duration, e.g., 1,000 microseconds, and still operate within normal operating limits, and it will respond to fast rising voltage transients in less than 10 microseconds, depending on the rate of rise of the voltage front of the transient) with the consistent low voltage clamping characteristics of a metal oxide varistor in response to fast rising voltage transients. The metal oxide varistor not only provides a lower clamping voltage than does a backup air gap in the event of a vented gas discharge tube, but it also eliminates the contamination and moisture problems associated with backup air gaps while continuing to provide protection in an operational mode, whereas a backup air gap may cause noise on the line after one operation. At the same time, the surge protector of the present invention provides protection against power cross and other types of failures.

Accordingly, in one aspect of the present invention, a protector arrangement is provided which includes first and second protector terminals, a gas discharge tube electrically coupled to the first and second protector terminals, and a metal oxide varistor. The metal oxide varistor is electrically coupled to the first and second protector terminals such that the first and second protector terminals are automatically shorted in response to a thermal overload condition.

In another aspect of the invention, a protector arrangement is provided having first, second, and third protector terminals. A gas discharge tube is electrically coupled to the first, second, and third protector terminals. A first metal oxide varistor is electrically coupled to the first and third protector terminals, and a second metal oxide varistor is electrically coupled to the second and third protector terminals to automatically short the first and third protector terminals in response to a thermal overload condition, and to automatically short the second and third protector terminals in response to a thermal overload condition.

In a further aspect of the invention, a protector arrangement includes first and second protector terminals and first and second protection elements. The first protection element is electrically coupled to the first and second protector terminals. The first and second protection elements are different types of protection elements. The second protection element has first and second element terminals, and the first element terminal is electrically coupled to the first protector terminal. A spring contact is electrically coupled to the second protector terminal, and is electrically and mechanically attached to the second element terminal. The spring contact is biased away from the first protector terminal by the second protection element in such a way that the spring contact is released by the second protection element upon occurrence of a thermal overload condition in order to short the first and second protector terminals.

In yet a further aspect of the invention, a protector arrangement includes first and second protector terminals, a gas discharge tube electrically coupled to the first and second protector terminals, and a metal oxide varistor. The metal oxide varistor is electrically coupled to the first and second protector terminals and in parallel to the gas discharge tube in such a way that the first and second protector terminals are automatically shorted in response to a vented condition of the gas discharge tube and a thermal overload condition.

The protector arrangement of the present invention may be provided in a weathertight housing.

BRIEF DESCRIPTION OF THE DRAWING

These and other features and advantages will become more apparent from a detailed consideration of the invention when taken in conjunction with the drawing in which.

DETAILED DESCRIPTION

Figure 1:
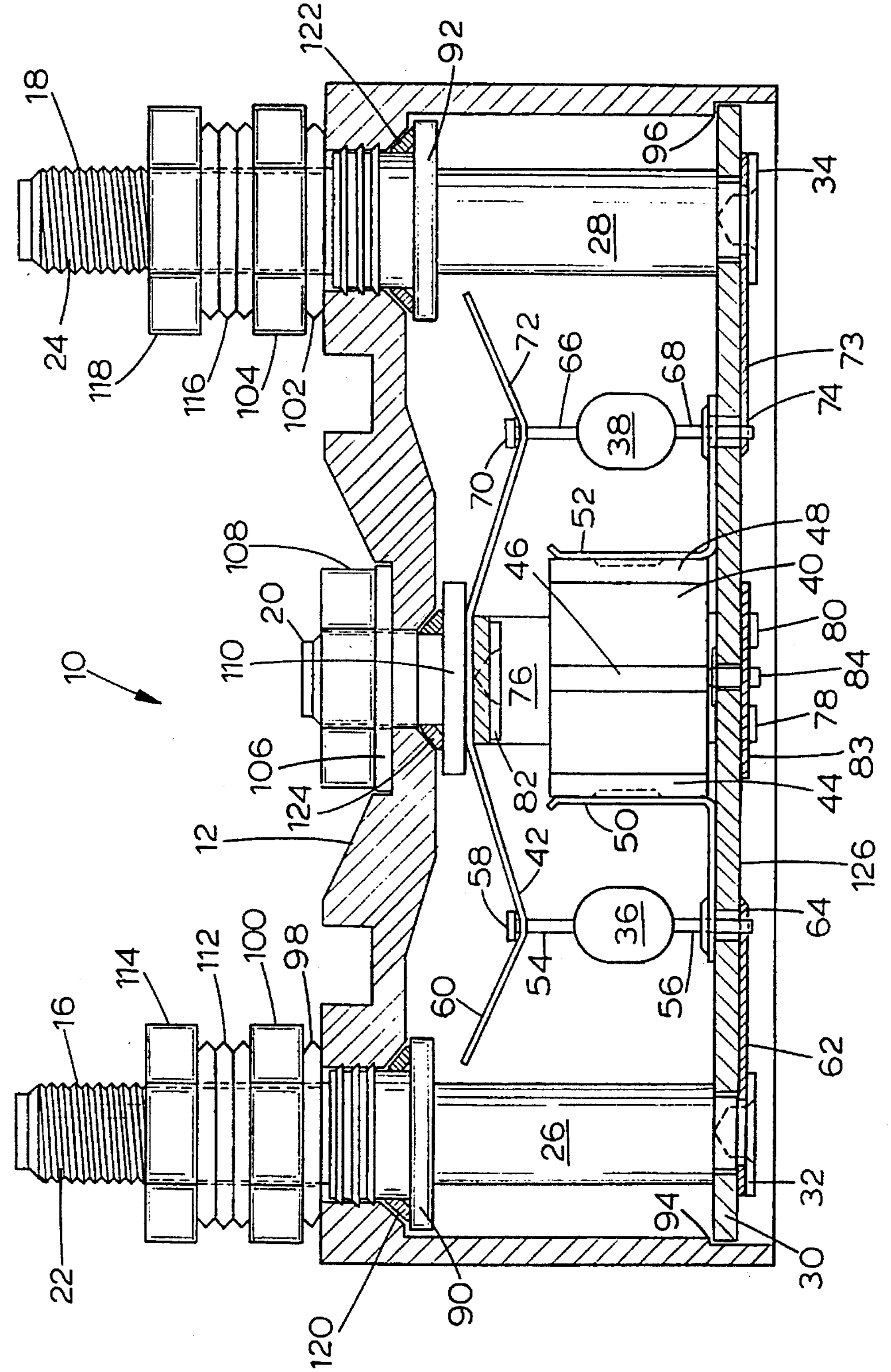
FIG. 1 is a partial cross-sectional diagram of the surge protector according to the present invention.
Figure 2:
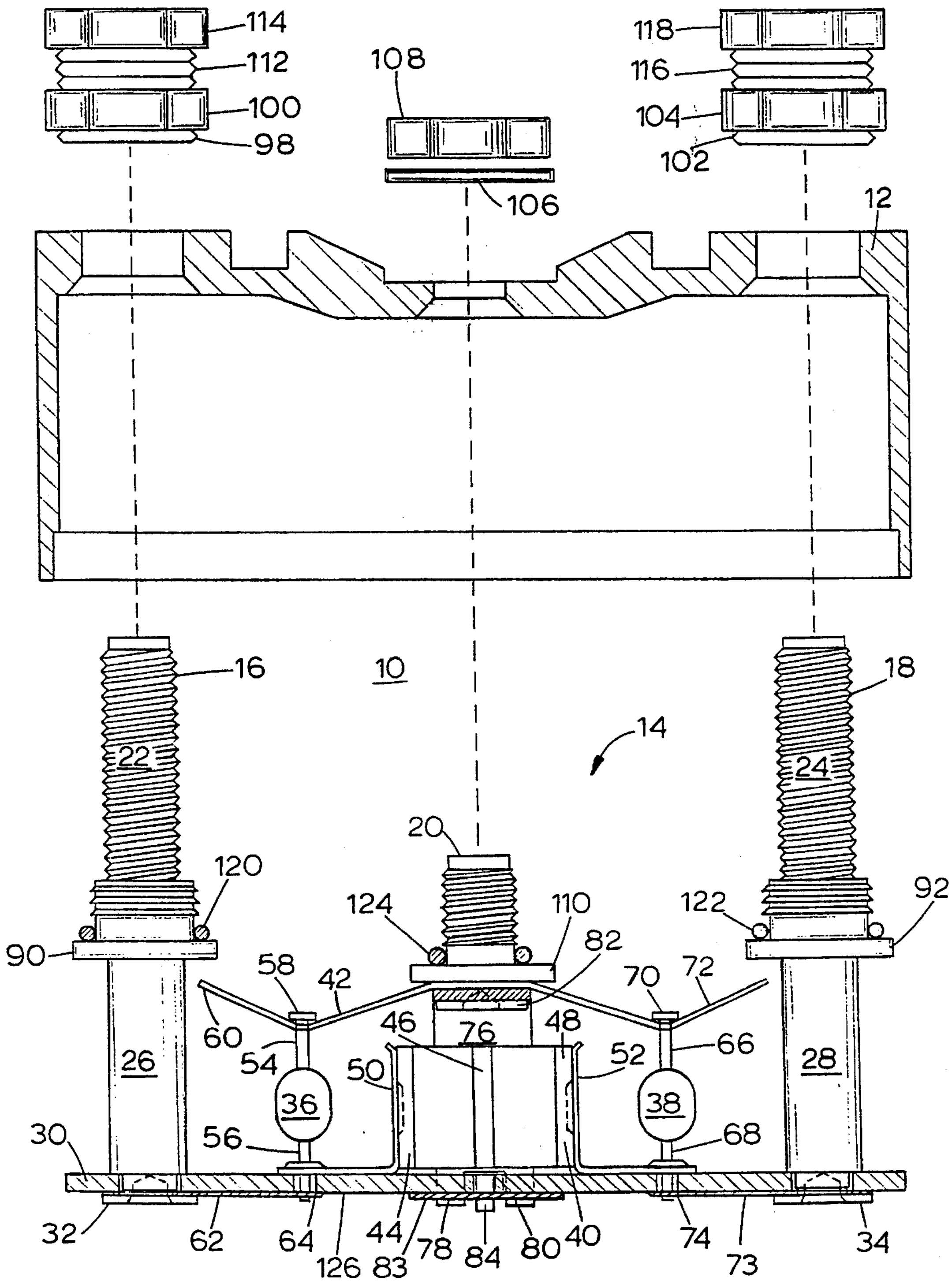
FIG. 2 is a partial exploded view of the surge protector shown in FIG. 1.
Figure 3:
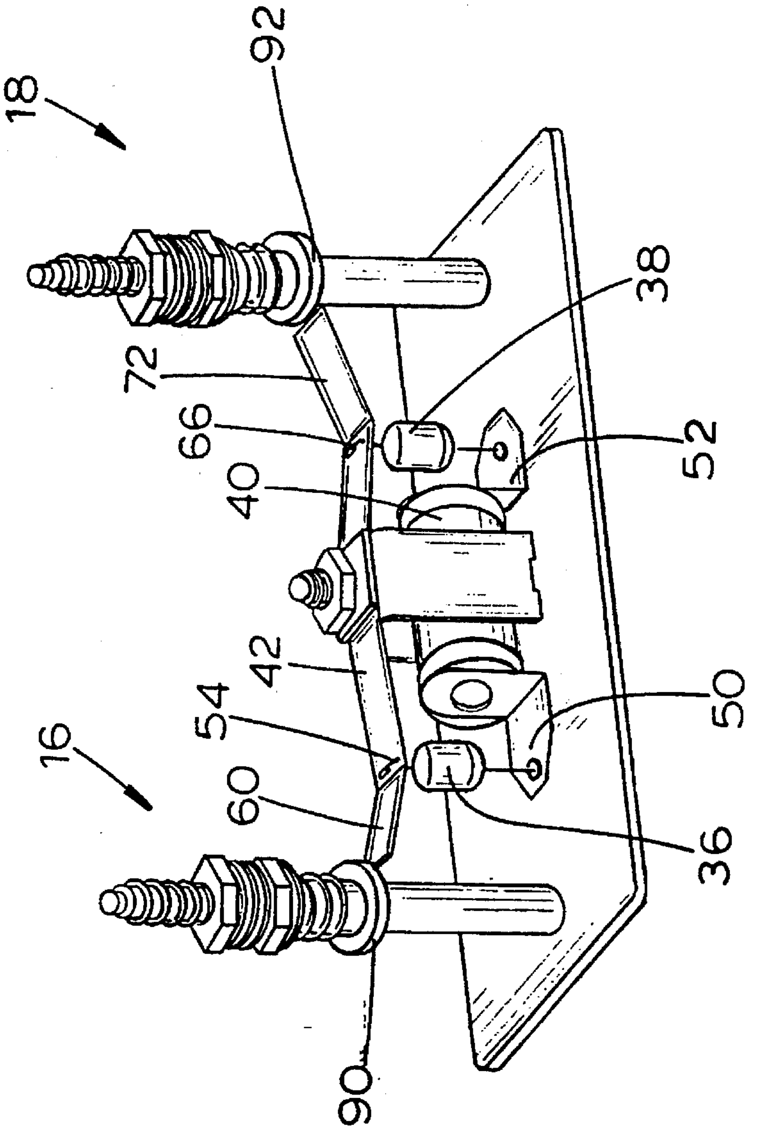
FIG. 3 is a perspective view of a subassembly of the surge protector shown in FIGS. 1 and 2.

As shown in FIGS. 1–3, a surge protector 10, such as a telephone subscriber station surge protector, includes a housing 12 and a subassembly 14. Although any suitable material may be used for the housing 12, the preferred housing material is a glass reinforced polyester because of its high temperature characteristics. The subassembly 14 includes electrically conductive terminals 16, 18, and 20. The electrically conductive terminals 16 and 18 may be in the form of electrically conducting posts having corresponding threaded ends 22 and 24 and corresponding non-threaded ends 26 and 28. The electrically conductive terminal 16 is staked to one end of a circuit board 30 by a rivet 32. Similarly, the electrically conductive terminal 18 is staked to another end of the circuit board 30 by a rivet 34.

The subassembly 14 further includes metal oxide varistors 36 and 38, a three terminal gas discharge tube 40, and a spring contact 42. The metal oxide varistors 36 and 38 may, for example, be metal oxide varistors manufactured under the part numbers V430MA3A or V430MA7B by Harris Semiconductor. Such metal oxide varistors have a high insulation resistance and a capacitance which is less than 30 pF. The spring contact 42 may be made of a beryllium copper alloy such as, for example, Brush Alloy 174HT available from Brush Wellman, Inc. The three terminal gas discharge tube 40 has terminals 44, 46, and 48. In essence, the gas discharge tube 40 could be replaced with two gas discharge tubes, one between the terminals 44 and 46, and one between the terminals 46 and 48; however, the three-element gas tube provides for balanced operation.

The terminal 44 of the gas discharge tube 40 is in electrical contact with an L-shaped conductor 50, and the terminal 48 of the gas discharge tube 40 is in electrical contact with an L-shaped conductor 52. The metal oxide varistor 36 has terminals 54 and 56. The terminal 54 of the metal oxide varistor 36 extends through the spring contact 42 and is terminated in a button 58 so as to hold the metal oxide varistor 36 to an end 60 of the spring contact 42 and so that the terminal 54 of the metal oxide varistor 36 is in electrical contact with the spring contact 42. Alternatively, as shown in FIG. 3, the terminal 54 of the metal oxide varistor 36 may be inserted through a first hole in the end 60 of the spring contact 42, bent, and inserted back through a second hole in the end 60 of the spring contact 42. The terminal 56 of the metal oxide varistor 36 is in electrical contact with the L-shaped conductor 50, and extends through the L-shaped conductor 50 to a conductor 62 of the circuit board 30. The portion of the terminal 56, which extends through the circuit board 30, is held to the circuit board 30 by a heat sensitive, fusible material 64, such as a heat sensitive solder.

Similarly, the metal oxide varistor 38 has terminals 66 and 68. The terminal 66 of the metal oxide varistor 38 extends through the spring contact 42 and is terminated in a button 70 so as to hold the metal oxide varistor 38 to an end 72 of the spring contact 42 and so that the terminal 66 of the metal oxide varistor 38 is in electrical contact with the spring contact 42. Alternatively, as shown in FIG. 3, the terminal 66 of the metal oxide varistor 38 may be inserted through a first hole in the end 72 of the spring contact 42, bent, and inserted back through a second hole in the end 72 of the spring contact 42. The terminal 68 of the metal oxide varistor 38 is in electrical contact with the L-shaped conductor 52, and extends through the L-shaped conductor 52 to conductor 73 of the circuit board 30. The portion of the terminal 68, which extends through the circuit board 30, is held to the circuit board 30 by a heat sensitive, fusible material 74, such as a heat sensitive solder.

A U-shaped bracket 76, having one or more prongs, such as prongs 78 and 80, is staked to the spring contact 42 and to the electrically conductive terminal 20 by way of a rivet 82 so that the U-shaped bracket 76 is in electrical contact with the spring contact 42 and the electrically conductive terminal 20. The U-shaped bracket 76 is also in electrical contact with the terminal 46 of the gas discharge tube 40 through a conductor 83. The prongs of the U-shaped bracket 76, such as the prongs 78 and 80, are inserted through corresponding holes in the circuit board 30 and are soldered to the conductor 83 so as to secure the U-shaped bracket 76 to the circuit board 30. Thus, the U-shaped bracket 76 and the L-shaped conductors 50 and 52 all serve to hold the gas discharge tube 40 in the position shown in the drawing. To further ensure that the terminal 46 of the gas discharge tube 40 is electrically in contact with the U-shaped bracket 76, the terminal 46 may be provided with an electrically conducting projection 84 which extends through the circuit board 30 and which may be suitably soldered to the conductor 83 on the circuit board 30 thus providing electrical contact to the prongs 78 and 80 of the U-shaped bracket 76.

The heat sensitive, fusible material 64, in addition to securing the metal oxide varistor 36 to the circuit board 30, electrically connects the terminal 56 of the metal oxide varistor 36 to the conductor 62 which is also in electrical contact with the electrically conductive terminal 16 through the rivet 32. Similarly, the heat sensitive, fusible material 74, in addition to securing the metal oxide varistor 38 to the circuit board 30, electrically connects the terminal 68 of the metal oxide varistor 38 to the conductor 73 which is also in electrical contact with the electrically conductive terminal 18 through the rivet 34.

Accordingly, a first electrical circuit is established from the electrically conductive terminal 16 to the electrically conductive terminal 20 through the rivet 32, through the conductor 62, through the heat sensitive, fusible material 64, through the terminals 54 and 56 of the metal oxide varistor 36, and through the spring contact 42. A second electrical circuit, parallel to the first electrical circuit, is established from the electrically conductive terminal 16 to the electrically conductive terminal 20 through the rivet 32, through the conductor 62, through the heat sensitive, fusible material 64, through the L-shaped conductor 50, through the terminals 44 and 46 of the gas discharge tube 40, through the electrically conducting projection 84, through the conductor 83, through the U-shaped bracket 76, and through the rivet 82.

Similarly, a third electrical circuit is established from the electrically conductive terminal 18 to the electrically conductive terminal 20 through the rivet 34, through the conductor 73, through the heat sensitive, fusible material 74, through the terminals 66 and 68 of the metal oxide varistor 38, and through the spring contact 42. A fourth electrical circuit, parallel to the third electrical circuit, is established from the electrically conductive terminal 18 to the electrically conductive terminal 20 through the rivet 34, through the conductor 73, through the heat sensitive, fusible material 74, through the L-shaped conductor 52, through the terminals 46 and 48 of the gas discharge tube 40, through the electrically conducting projection 84, through the conductor 83, through the U-shaped bracket 76, and through the rivet 82.

During assembly of the subassembly 14, the terminal 54 of the metal oxide varistor 36 is suitably attached to the spring contact 42. The terminal 56 of the metal oxide varistor 36 is inserted through the L-shaped conductor 50 and the circuit board 30 and is pulled until a predetermined amount of tension is placed upon the end 60 of the spring contact 42. The actual predetermined amount of tension depends upon the materials and components which are selected for the surge protector 10. When the correct amount of tension is placed on the end 60 of the spring contact 42, the heat sensitive, fusible material 64 is applied to the terminal 56 and allowed to set in order to hold the end 60 of the spring contact 42 under tension. Accordingly, the end 60 of the spring contact 42 is biased away from a shoulder 90 of the electrically conductive terminal 16.

Similarly, the terminal 66 of the metal oxide varistor 38 is suitably attached to the spring contact 42. The terminal 68 of the metal oxide varistor 38 is inserted through the L-shaped conductor 52 and the circuit board 30 and is pulled until a predetermined amount of tension is placed upon the end 72 of the spring contact 42. When the correct amount of tension is placed on the end 72 of the spring contact 42, the heat sensitive, fusible material 74 is applied to the terminal 68 and allowed to set in order to hold the end 72 of the spring contact 42 under tension. Accordingly, the end 72 of the spring contact 42 is biased away from a shoulder 92 of the electrically conductive terminal 18.

The subassembly 14 is then inserted into the housing 12 so that the circuit board 30 abuts shoulders 94 and 96 of the housing 12 and so that the electrically conductive terminals 16, 18, and 20 extend through the housing 12 as shown. A washer 98 is placed over the electrically conductive terminal 16, and an internally threaded nut 100 is threaded onto the threaded end 22 of the electrically conductive terminal 16 until the shoulder 90 abuts the housing 12. Similarly, a washer 102 is slipped over the electrically conductive terminal 18, and an internally threaded nut 104 is threaded onto the threaded end 24 of the electrically conductive terminal 18 until the shoulder 92 abuts the housing 12. An electrical terminal 106 is placed over the electrically conductive terminal 20, and an internally threaded nut 108 is threaded over the electrically conductive terminal 20 until a shoulder 110 of the electrically conductive 20 abuts the housing 12. Accordingly, the electrical terminal 106 is secured to the housing 12, an electrical connection is provided between the electrically conductive terminal 20 and the electrical terminal 106, and the housing 12 is secured to the subassembly 14.

Electrical conductors to be protected may then be connected to the electrically conductive terminals 16 and 18, and a ground conductor, for example, may be connected to the electrically conductive terminal 20 by way of the electrical terminal 106. One or more washers 112 and an internally threaded nut 114 are provided to secure an electrical conductor to be protected to the electrically conductive terminal 16. One or more washers 116 and an internally threaded nut 118 are provided to secure an electrical conductor to be protected to the electrically conductive terminal 18. Alternatively, insulation displacement connector (IDC) terminals may be utilized to connect electrical conductors to the electrically conductive terminals 16 and 18.

Furthermore, during assembly of the surge protector 10, O-ring seals 120, 122, and 124 may be provided between the housing 12 and the corresponding shoulders 90, 92, and 110, and the underside 126 of the circuit board 30 may be potted with an epoxy so that the interior of the housing 12, between the housing 12 and the circuit board 30, is sealed against weather.

During normal operation of the surge protector 10, overvoltage electrical surges on the electrical conductors connected to the electrically conductive terminals 16 and 18 cause the gas discharge tube 40 to conduct. Thus, these electrical surges are conducted from the electrically conductive terminals 16 and 18 through the gas discharge tube 40 to ground by way of the electrical terminal 106. In the event of a failure of the gas discharge tube 40 (e.g., in a vented mode), the metal oxide varistors 36 and 38 continue to operate to provide electrical surge protection.

Figure 4:
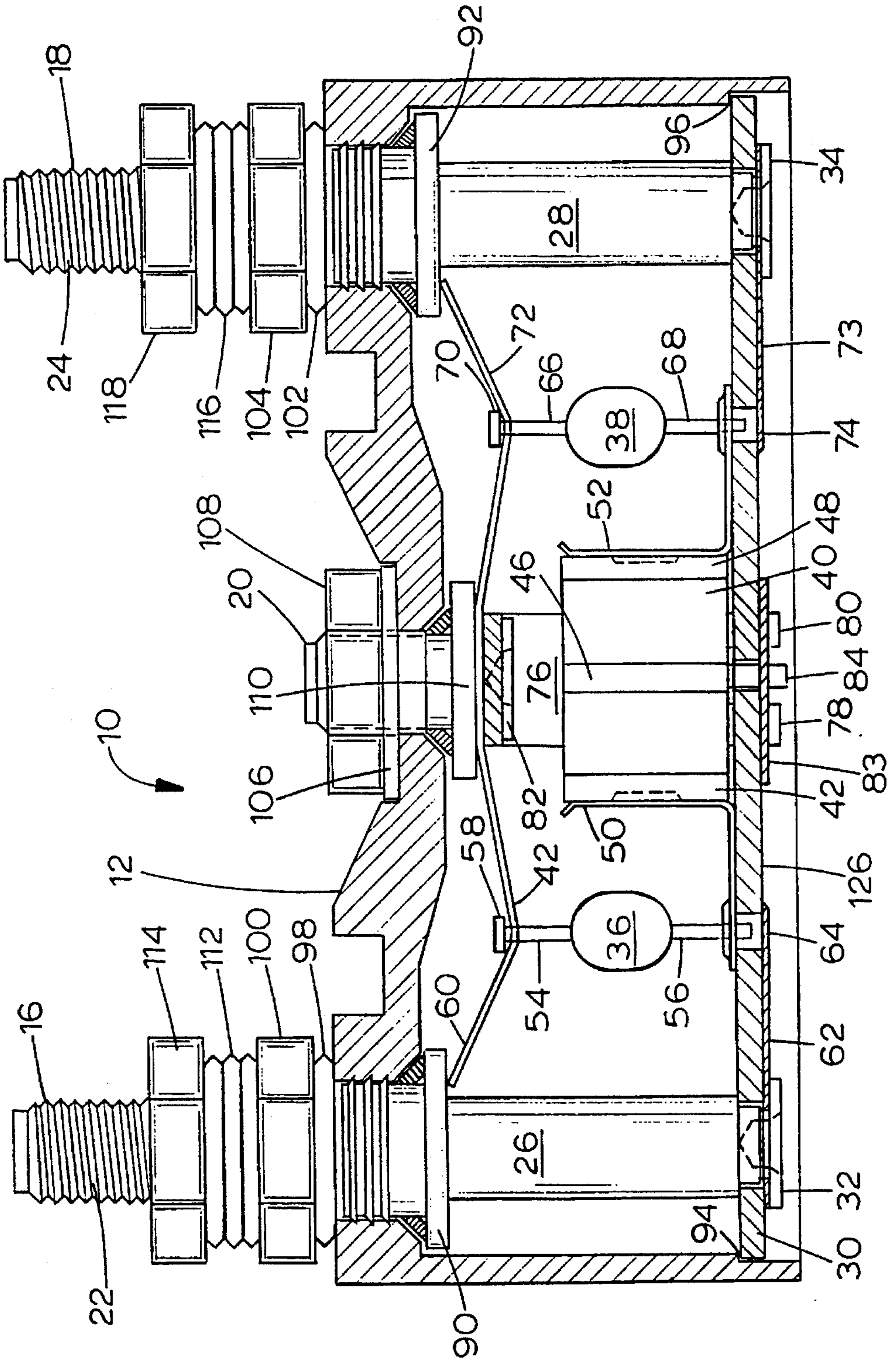
FIG. 4 illustrates the surge protector according to the present invention wherein the surge protector has shorted in response to a thermal overload condition created by an overheated gas discharge tube; and, FIG. 5 illustrates the surge protector according to the present invention wherein the surge protector has shorted in response to an overstressed metal oxide varistor.

As shown in FIG. 4, if the surge protector 10 experiences a thermal overload failure, the surge protector shorts the electrically conductive terminals 16 and 18 to the electrically conductive terminal 20. That is, any condition, such as an overheated gas discharge tube produced, for example, by a power cross or other similar power conducting event, which results in excessive heat in the housing 12, causes the heat sensitive, fusible materials 64 and 74 to fuse (melt) and release the metal oxide varistors 36 and 38. The tension on the ends 60 and 72 of the spring contact 42 is thereby released so that the ends 60 and 72 of the spring contact 42 freely move until they electrically contact the shoulders 90 and 92 of the corresponding electrically conductive terminals 16 and 18. Thus, a short circuit condition is provided between the electrically conductive terminal 16 and the electrically conductive terminal 20, and a short circuit condition is provided between the electrically conductive terminal 18 and the electrically conductive terminal 20.

Figure 5:
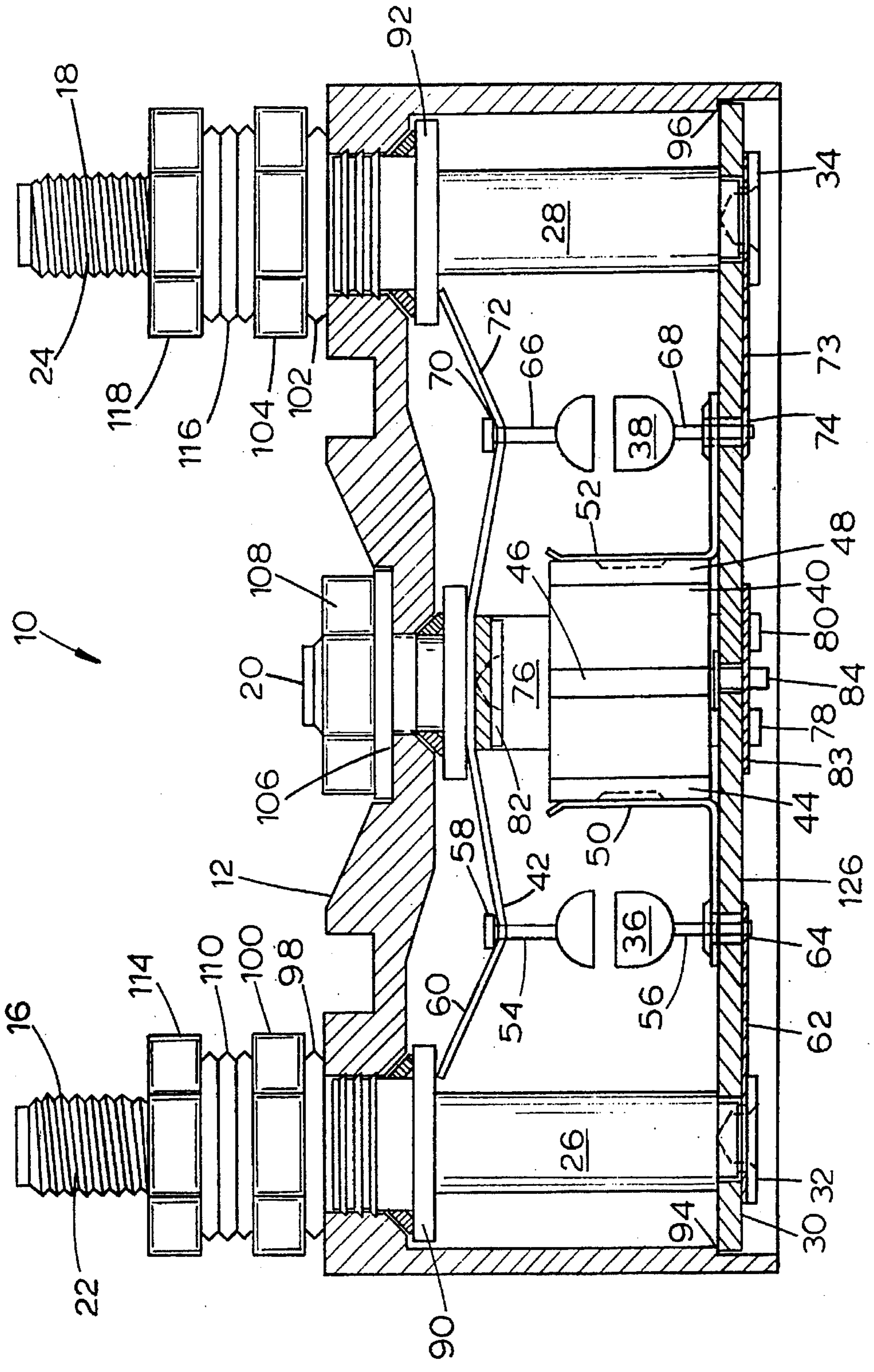

Furthermore, as shown in FIG. 5, in the event of overstressed or failed metal oxide varistors, the metal oxide varistors 36 and/or 38 fracture causing the fractured metal oxide varistors to separate and release the holding forces from the ends 60 and/or 72 of the spring contact 42. Accordingly, the ends 60 and/or 72 of the spring contact 42 freely move until they electrically contact the shoulders 90 and/or 92 of the corresponding electrically conductive terminals 16 and/or 18. Thus, a short circuit condition is provided between the electrically conductive terminal 16 and the electrically conductive terminal 20, and/or a short circuit condition is provided between the electrically conductive terminal 18 and the electrically conductive terminal 20.

Certain modifications may be made without departing from the scope of the present invention. For example, instead of a surge protector including two metal oxide varistors and one three-terminal gas discharge tube to protect two electrical conductors, these two conductors can be protected by a surge protector having two metal oxide varistors and two two-terminal gas discharge tubes. Moreover, instead of a surge protector which is arranged to protect two electrical conductors, the surge protector may be arranged with one metal oxide varistor and one two-terminal gas discharge tube to protect one electrical conductor. Additional modifications of the present invention will be apparent to those skilled in the art.

We claim:

1. A protector arrangement comprising:

first and second protector terminals;

a gas discharge tube electrically coupled to the first and second protector terminals;

a metal oxide varistor; and, means for electrically coupling the metal oxide varistor to the first and second protector terminals such that the first and second protector terminals are automatically shorted in response to a thermal overload condition.

2. The protector arrangement of claim 1 wherein the protector arrangement has a capacitance which is less than 30 pF, wherein the gas discharge tube has a breakdown voltage, wherein the metal oxide varistor has a clamping voltage above the breakdown voltage of the gas discharge tube, wherein the gas discharge tube has a response time on the order of about 7.5 microseconds at 100 volts per microsecond rise, and wherein the metal oxide varistor has a response time which is shorter than the response time of the gas discharge tube.

3. A protector arrangement comprising:

first and second protector terminals;

a gas discharge tube electrically coupled to the first and second protector terminals;

a metal oxide varistor; and, means for electrically coupling the metal oxide varistor to the first and second protector terminals such that the first and second protector terminals are automatically shorted in response to a thermal overload condition, wherein the means comprises a spring contact which is electrically coupled to the second protector terminal and which is biased away from the first protector terminal until an occurrence of the thermal overload condition.

4. A protector arrangement comprising:

first and second protector terminals;

a gas discharge tube electrically coupled to the first and second protector terminals;

a metal oxide varistor; and, means for electrically coupling the metal oxide varistor to the first and second protector terminals such that the first and second protector terminals are automatically shorted in response to a thermal overload condition, wherein the metal oxide varistor has first and second varistor terminals, wherein the first varistor terminal is electrically coupled to the first protector terminal, wherein the means comprises a spring contact electrically coupled to the second protector terminal, wherein the spring contact is electrically coupled to the second varistor terminal, and wherein the spring contact is biased away from the first protector terminal in such a way that the spring contact is released upon occurrence of the thermal overload condition in order to short the first and second protector terminals.

5. The protector arrangement of claim 4 wherein the first varistor terminal is electrically coupled to the first protector terminal by a heat sensitive material which fuses in the presence of heat generated by the thermal overload condition.

6. A protector arrangement comprising:

first and second protector terminals;

a gas discharge tube electrically coupled to the first and second protector terminals;

a metal oxide varistor; and, means for electrically coupling the metal oxide varistor to the first and second protector terminals such that the first and second protector terminals are automatically shorted in response to a thermal overload condition, wherein the metal oxide varistor has first and second varistor terminals, wherein the first varistor terminal is electrically coupled to the first protector terminal, wherein the means comprises a spring contact electrically coupled to the second protector terminal, wherein the spring contact is electrically and mechanically attached to the second varistor terminal, and wherein the spring contact is biased away from the first protector terminal by the metal oxide varistor in such a way that the spring contact is released by the metal oxide varistor upon occurrence of the thermal overload condition in order to short the first and second protector terminals.

7. The protector arrangement of claim 6 wherein the first varistor terminal is electrically coupled to the first protector terminal by a heat sensitive material which fuses in the presence of heat generated by the thermal overload condition to release the metal oxide varistor to in turn release the spring contact in order to short the first and second protector terminals.

8. A protector arrangement comprising:

first and second protector terminals;

a gas discharge tube electrically coupled to the first and second protector terminals;

a metal oxide varistor; and, means for electrically coupling the metal oxide varistor to the first and second protector terminals such that the first and second protector terminals are automatically shorted in response to a thermal overload condition, wherein the protector arrangement has a capacitance which is less than 30 pF, wherein the gas discharge tube has a breakdown voltage, wherein the metal oxide varistor has a clamping voltage above the breakdown voltage of the gas discharge tube, wherein the gas discharge tube has a response time on the order of about 7.5 microseconds at 100 volts per microsecond rise, and wherein the metal oxide varistor has a response time which is shorter than the response time of the gas discharge tube, wherein the means comprises a spring contact attached to the second protector terminal and biased away from the first protector terminal until an occurrence of the thermal overload condition.

9. A protector arrangement comprising:

first and second protector terminals;.

a gas discharge tube electrically coupled to the first and second protector terminals;

a metal oxide varistor; and, means for electrically coupling the metal oxide varistor to the first and second protector terminals such that the first and second protector terminals are automatically shorted in response to a thermal overload condition, wherein the protector arrangement has a capacitance which is less than 30 pF, wherein the gas discharge tube has a breakdown voltage, wherein the metal oxide varistor has a clamping voltage above the breakdown voltage of the gas discharge tube, wherein the gas discharge tube has a response time on the order of about 7.5 microseconds at 100 volts per microsecond rise, and wherein the metal oxide varistor has a response time which is shorter than the response time of the gas discharge tube, wherein the metal oxide varistor has first and second varistor terminals, wherein the first varistor terminal is electrically coupled to the first protector terminal, wherein the means comprises a spring contact electrically coupled to the second protector terminal, wherein the spring contact is electrically coupled to the second varistor terminal, and wherein the spring contact is biased away from the first protector terminal in such a way that the spring contact is released upon occurrence of the thermal overload condition in order to short the first and second protector terminals.

10. The protector arrangement of claim 9 wherein the first varistor terminal is electrically coupled to the first protector terminal by a heat sensitive material which fuses in the presence of heat generated by the thermal overload condition.

11. A protector arrangement comprising:

first and second protector terminals;

a gas discharge tube electrically coupled to the first and second protector terminals;

a metal oxide varistor; and, means for electrically coupling the metal oxide varistor to the first and second protector terminals such that the first and second protector terminals are automatically shorted in response to a thermal overload condition, wherein the protector arrangement has a capacitance which is less than 30 pF, wherein the gas discharge tube has a breakdown voltage, wherein the metal oxide varistor has a clamping voltage above the breakdown voltage of the gas discharge tube, wherein the gas discharge tube has a response time on the order of about 7.5 microseconds at 100 volts per microsecond rise, and wherein the metal oxide varistor has a response time which is shorter than the response time of the gas discharge tube, wherein the metal oxide varistor has first and second varistor terminals, wherein the first varistor terminal is electrically coupled to the first protector terminal, wherein the means comprises a spring contact electrically coupled to the second protector terminal, wherein the spring contact is electrically and mechanically attached to the second varistor terminal, and wherein the spring contact is biased away from the first protector terminal by the metal oxide varistor in such a way that the spring contact is released by the metal oxide varistor upon occurrence of the thermal overload condition in order to short the first and second protector terminals.

12. The protector arrangement of claim 11 wherein the first varistor terminal is electrically coupled to the first protector terminal by a heat sensitive material which fuses in the presence of heat generated by the thermal overload condition to release the metal oxide varistor to in turn release the spring contact in order to short the first and second protector terminals.

13. A protector arrangement comprising:

first, second, and third protector terminals;

a gas discharge tube electrically coupled to the first, second, and third protector terminals;

a first metal oxide varistor;

a second metal oxide varistor; and, means for electrically coupling the first metal oxide varistor to the first and third protector terminals, for electrically coupling the second metal oxide varistor to the second and third protector terminals, for automatically shorting the first and third protector terminals in response to a thermal overload condition, and for automatically shorting the second and third protector terminals in response to a thermal overload condition.

14. A protector arrangement comprising:

first, second, and third protector terminals;

a gas discharge tube electrically coupled to the first, second, and third protector terminals;

a first metal oxide varistor;

a second metal oxide varistor; and, means for electrically coupling the first metal oxide varistor to the first and third protector terminals, for electrically coupling the second metal oxide varistor to the second and third protector terminals, for automatically shorting the first and third protector terminals in response to a thermal overload condition, and for automatically shorting the second and third protector terminals in response to a thermal overload condition, wherein the means comprises a spring contact electrically attached to the third protector terminal and biased away from the first and second protector terminals until an occurrence of a thermal overload condition.

15. A protector arrangement comprising:

first, second, and third protector terminals;

a gas discharge tube electrically coupled to the first, second, and third protector terminals;

a first metal oxide varistor;

a second metal oxide varistor; and, means for electrically coupling the first metal oxide varistor to the first and third protector terminals, for electrically coupling the second metal oxide varistor to the second and third protector terminals, for automatically shorting the first and third protector terminals in response to a thermal overload condition, and for automatically shorting the second and third protector terminals in response to a thermal overload condition, wherein the first metal oxide varistor has first and second varistor terminals, wherein the second metal oxide varistor has first and second varistor terminals, wherein the first varistor terminal of the first metal oxide varistor is electrically coupled to the first protector terminal, wherein the first varistor terminal of the second metal oxide varistor is electrically coupled to the second protector terminal, wherein the means comprises a spring contact electrically coupled to the third protector terminal, wherein the spring contact is electrically coupled to the second varistor terminals of the first and second metal oxide varistors, and wherein the spring contact is biased away from the first and second protector terminals in such a way that the spring contact is released upon occurrence of a thermal overload condition in order to short the first, second, and third protector terminals.

16. The protector arrangement of claim 15 wherein the first varistor terminal of the first metal oxide varistor is electrically coupled to the first protector terminal by a heat sensitive material which fuses in the presence of heat generated by a thermal overload condition, and wherein the first varistor terminal of the second metal oxide varistor is electrically coupled to the second protector terminal by a heat sensitive material which fuses in the presence of heat generated by a thermal overload condition.

17. A protector arrangement comprising:

first, second, and third protector terminals;

a gas discharge tube electrically coupled to the first, second, and third protector terminals;

a first metal oxide varistor;

a second metal oxide varistor; and, means for electrically coupling the first metal oxide varistor to the first and third protector terminals, for electrically coupling the second metal oxide varistor to the second and third protector terminals, for automatically shorting the first and third protector terminals in response to a thermal overload condition, and for automatically shorting the second and third protector terminals in response to a thermal overload condition, wherein the first metal oxide varistor has first and second varistor terminals, wherein the second metal oxide varistor has first and second varistor terminals, wherein the first varistor terminal of the first metal oxide varistor is electrically coupled to the first protector terminal, wherein the first varistor terminal of the second metal oxide varistor is electrically coupled to the second protector terminal, wherein the means comprises a spring contact electrically coupled to the third protector terminal, wherein the spring contact is electrically and mechanically attached to the second varistor terminals of the first and second metal oxide varistors, wherein the spring contact is biased away from the first protector terminal by the first metal oxide varistor in such a way that the spring contact is released upon occurrence of a thermal overload condition to in order short the first and third protector terminals, and wherein the spring contact is biased away from the second protector terminal by the second metal oxide varistor in such a way that the spring contact is released upon occurrence of a thermal overload condition in order to short the second and third protector terminals.

18. The protector arrangement of claim 17 wherein the first varistor terminal of the first metal oxide varistor is electrically coupled to the first protector terminal by a heat sensitive material which fuses in the presence of heat generated by a thermal overload condition to release the first metal oxide varistor to in turn release the spring contact in order to short the first and third protector terminals, and wherein the first varistor terminal of the second metal oxide varistor is electrically coupled to the second protector terminal by a heat sensitive material which fuses in the presence of heat generated by a thermal overload condition to release the second metal oxide varistor to in turn release the spring contact in order to short the second and third protector terminals.

19. A protector arrangement comprising:.

first, second, and third protector terminals;

a gas discharge tube electrically coupled to the first, second, and third protector terminals;

a first metal oxide varistor;

a second metal oxide varistor; and, means for electrically coupling the first metal oxide varistor to the first and third protector terminals, for electrically coupling the second metal oxide varistor to the second and third protector terminals, for automatically shorting the first and third protector terminals in response to a thermal overload condition, and for automatically shorting the second and third protector terminals in response to a thermal overload condition, wherein the protector arrangement has a capacitance which is less than 30 pF, wherein the gas discharge tube has a breakdown voltage, wherein each of the first and second metal oxide vafistors has a clamping voltage above the breakdown voltage of the gas discharge tube, wherein the gas discharge tube has a response time on the order of about 7.5 microseconds at 100 volts per microsecond rise, and wherein each of the first and second metal oxide varistors has a response time which is shorter than the response time of the gas discharge tube.

20. The protector arrangement of claim 19 wherein the means comprises a spring contact electrically attached to the third protector terminal and biased away from the first and second protector terminals until an occurrence of a thermal overload condition.

21. The protector arrangement of claim 19 wherein the first metal oxide varistor has first and second varistor terminals, wherein the second metal oxide varistor has first and second varistor terminals, wherein the first varistor terminal of the first metal oxide varistor is electrically coupled to the first protector terminal, wherein the first varistor terminal of the second metal oxide varistor is electrically coupled to the second protector terminal, wherein the means comprises a spring contact electrically coupled to the third protector terminal, wherein the spring contact is electrically coupled to the second varistor terminals of the first and second metal oxide varistors, and wherein the spring contact is biased away from the first and second protector terminals in such a way that the spring contact is released upon occurrence of a thermal overload condition in order to short the first, second, and third protector terminals.

22. The protector arrangement of claim 21 wherein the first varistor terminal of the first metal oxide varistor is electrically coupled to the first protector terminal by a heat sensitive material which fuses in the presence of heat generated by a thermal overload condition, and wherein the first varistor terminal of the second metal oxide varistor is electrically coupled to the second protector terminal by a heat sensitive material which fuses in the presence of heat generated by a thermal overload condition.

23. The protector arrangement of claim 19 wherein the first metal oxide varistor has first and second varistor terminals, wherein the second metal oxide varistor has first and second varistor terminals, wherein the first varistor terminal of the first metal oxide varistor is electrically coupled to the first protector terminal, wherein the first varistor terminal of the second metal oxide varistor is electrically coupled to the second protector terminal, wherein the means comprises a spring contact electrically coupled to the third protector terminal, wherein the spring contact is electrically and mechanically attached to the second varistor terminals of the first and second metal oxide varistors, wherein the spring contact is biased away from the first protector terminal by the first metal oxide varistor in such a way that the spring contact is released upon occurrence of a thermal overload condition in order to short the first and third protector terminals, and wherein the spring contact is biased away from the second protector terminal by the second metal oxide varistor in such a way that the spring contact is released upon occurrence of a thermal overload condition in order to short the second and third protector terminals.

24. The protector arrangement of claim 23 wherein the first varistor terminal of the first metal oxide varistor is electrically coupled to the first protector terminal by a heat sensitive material which fuses in the presence of heat generated by a thermal overload condition to release the first metal oxide varistor to in turn release the spring contact in order to short the first and third protector terminals, and wherein the first varistor terminal of the second metal oxide varistor is electrically coupled to the second protector terminal by a heat sensitive material which fuses in the presence of heat generated by a thermal overload condition to release the second metal oxide varistor to in turn release the spring contact in order to short the second and third protector terminals.

25. A protector arrangement comprising:

first and second protector terminals;

a first protection element electrically coupled to the first and second protector terminals;

a second protection element, wherein the first and second protection elements are different types of protection elements, wherein the second protection element has first and second element terminals, and wherein the first element terminal is electrically coupled to the first protector terminal; and, a spring contact electrically coupled to the second protector terminal and electrically and mechanically attached to the second element terminal, wherein the spring contact is biased away from the first protector terminal by the second protection element in such a way that the spring contact is released by the second protection element upon occurrence of a thermal overload condition in order to short the first and second protector terminals.

26. The protector arrangement of claim 25 wherein the first element terminal is electrically coupled to the first protector terminal by a heat sensitive material which fuses in the presence of heat generated by a thermal overload condition to release the second protection element to in turn release the spring contact in order to short the first and second protector terminals.

27. The protector arrangement of claim 26 wherein the protector arrangement is mounted within a weathertight housing.

28. A protector arrangement comprising:

first and second protector terminals;

a gas discharge tube electrically coupled to the first and second protector terminals;

a metal oxide varistor; and, means for electrically coupling the metal oxide varistor to the first and second protector terminals in parallel to the gas discharge tube such that the first and second protector terminals are automatically shorted in response to a vented condition of the gas discharge tube and a thermal overload condition.

29. A protector arrangement comprising:

first and second protector terminals;

a gas discharge tube electrically coupled to the first and second protector terminals;

a metal oxide varistor; and, means for electrically coupling the metal oxide varistor to the first and second protector terminals in parallel to the gas discharge tube such that the first and second protector terminals are automatically shorted in response to a vented condition of the gas discharge tube and a thermal overload condition, wherein the metal oxide varistor has first and second varistor terminals, wherein the first varistor terminal is electrically coupled to the first protector terminal, wherein the means comprises a spring contact electrically coupled to the second protector terminal, wherein the spring contact is electrically coupled to the second varistor terminal, and wherein the spring contact is biased away from the first protector terminal in such a way that the spring contact is released upon occurrence of the thermal overload condition in order to short the first and second protector terminals.

30. The protector arrangement of claim 29 wherein the first varistor terminal is electrically coupled to the first protector terminal by a heat sensitive material which fuses in the presence of heat generated by the thermal overload condition.

31. A protector arrangement comprising:

first and second protector terminals;

a gas discharge tube electrically coupled to the first and second protector terminals;

a metal oxide varistor; and, means for electrically coupling the metal oxide varistor to the first and second protector terminals in parallel to the gas discharge tube such that the first and second protector terminals are automatically shorted in response to a vented condition of the gas discharge tube and a thermal overload condition, wherein the metal oxide varistor has first and second varistor terminals, wherein the first varistor terminal is electrically coupled to the first protector terminal, wherein the means comprises a spring contact electrically coupled to the second protector terminal, wherein the spring contact is electrically and mechanically attached to the second varistor terminal, and wherein the spring contact is biased away from the first protector terminal by the metal oxide varistor in such a way that the spring contact is released by the metal oxide varistor upon occurrence of the thermal overload condition in order to short the first and second protector terminals.

32. The protector arrangement of claim 31 wherein the first varistor terminal is electrically coupled to the first protector terminal by a heat sensitive material which fuses in the presence of heat generated by the thermal overload condition to release the metal oxide varistor to in turn release the spring contact in order to short the first and second protector terminals.

* * * * *